United States Patent Office 3,252,971
Patented May 24, 1966

3,252,971
FUSED BENZOHETEROCYCLIC DERIVATIVES OF 6-AMINOPENICILLANIC ACID
Alfred W. Chow, Merchantville, N.J., and John R. E. Hoover, Glenside, Pa., assignors to Smith Kline & French Laboratories, Philadelphia, Pa., a corporation of Pennsylvania
No Drawing. Filed Dec. 27, 1961, Ser. No. 162,572
8 Claims. (Cl. 260—239.1)

This invention relates to novel antimicrobial agents and more particularly pertains to new penicillin-like compounds.

This application is a continuation-in-part of our copending application Serial No. 113,981, filed May 3, 1961, now abandoned. Therein described are novel penicillins possessing heterocyclic side chains which are substituted by a phenyl ring in the position adjacent to the carboxyamido linkage.

It has now been found that other compounds of the class in which these compounds fall exhibit similar antimicrobial activity. Many of the compounds embracing the structural requirements of this invention also exhibit a high degree of activity against certain of the "penicillin-resistant" staphylococci. Furthermore, many of these compounds exhibit the additional property of exhibiting this activity when administered orally.

The compounds of the present invention are represented by the following structural formula:

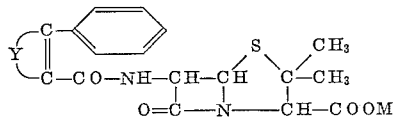

in which Y is the residue of a heterocyclic ring system of a class more fully described hereafter and M is a pharmaceutically acceptable non-toxic cation.

It can be seen that the present invention embraces new penicillin compounds in which the side chain is a heterocyclic ring system. This ring contains at least two adjacent carbon atoms. A phenyl group is attached to one of these carbon atoms while the carbon atom vicinal to it is directly bound to the carboxyamido linkage of 6-carboxamidopenicillanic acid. Furthermore, these two carbon atoms are separated by an unsaturated bond which may be of an olefinic nature (and hence positionally limited between these two atoms) or an unsaturated bond of aromatic nature which while diagrammatically represented as being situated between these two carbon atoms, is, in fact, of resonance structure. These two carbon atoms are therefore, themselves embraced within the heterocyclic ring system and taken together with Y complete the skeleton of the heterocyclic ring.

In particular, the residue of the heterocyclic ring is represented by the structures:

(a)  

in which A and B are like or different groups which are (CH), (N) or taken together a benzo group, D is (NH), (S), or if A and B are the same or together represent benzo, D may also be (O); and (b) 

in which A' and E' are like or different groups which are (CH) or (N), B' and D' are like or different groups which are (CH), (NH), or, if A' and E' are both (N) the group:

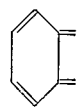

provided that the groups A', B', D' and E' at least one but not more than two are (N).

More specifically for example, under subgroup (a) above, the residue of the heterocyclic ring and the corresponding heterocyclic ring may be as follows:

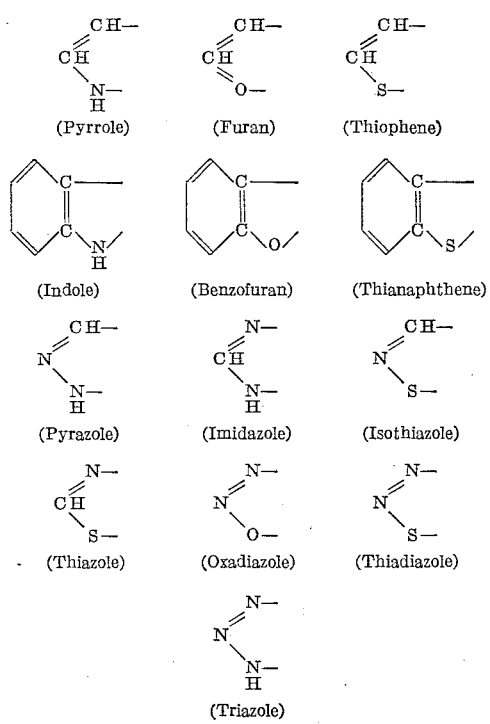

The residue Y and the corresponding heterocyclic rings under subgroup (b) above may be for example as follows:

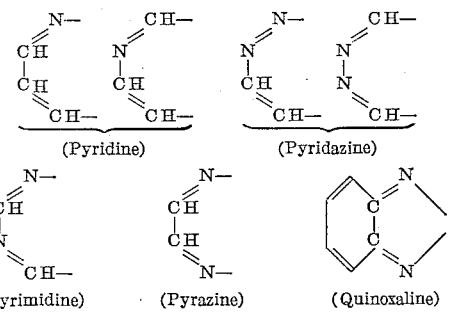

When taken with the remaining moiety of our compounds, it can be seen that in each compound the complete heterocyclic ring will always have two adjacent carbon atoms, to one of which is attached a phenyl group and to the other, the 6-carboxamidopenicillanic acid group. It will be noted that the above groups which make up the residue of the heterocyclic ring are not limited to the diagrammatical orientation with respect to Y. That is, unless the particular heterocyclic ring is symmetrical with respect to these two carbon atoms, at least two positionally isomeric phenyl-heterocyclic compounds are embraced. Thus for example, where Y represents:

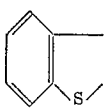

both of the following structures are embraced:

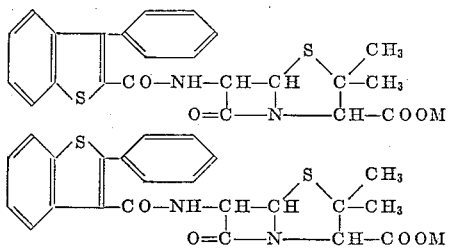

The heterocyclic rings described herein are all 5 and 6 membered rings which in certain instances may have a benzo moiety fused thereto. In such instances, the benzo ring is represented by the structure:

or

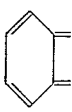

The former structure is employed in the case of the 5-membered heterocyclic rings while the latter is employed in the case of the 6-membered rings. This latter structure is solely diagrammatic and arises by the arbitrary fixing of the position of the carbon-carbon bond in the heterocyclic ring; i.e.,

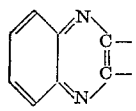

It is, in all other respects, a benzo ring of aromatic nature.

In those compounds in which a benzo moiety is fused to the heterocyclic ring, there may be present other substituents on the benzo moiety such as chloro, fluoro, bromo, methyl, ethyl, methoxy, amino, trifluoromethyl, amido, hydroxy, and the like.

The heterocyclic nomenclature employed throughout the present application is in accordance with that employed in "The Ring Index," Patterson, Capell and Walker, 2nd edition, American Chemical Society, Washington, D.C., 1960.

Many of the above phenyl-heterocyclic carboxylic acids employed as starting materials in the process of this invention are known to the art. Those which are new may be prepared according to known processes employed for similar heterocyclic compounds as for example, by ring closure. These procedures are more fully exemplified hereafter.

The compounds of the present invention are prepared by acylating 6-aminopenicillanic acid with an acid chloride, acid bromide, anhydride, or mixed anhydride of the above phenyl-heterocyclic carboxylic acids. The preferred acylation procedure involves use of an acid chloride in an inert water miscible solvent, followed by isolation of the resultant compound by extraction, precipitation or evaporation.

The compounds of the present invention include in addition to the novel penicillanic acid derivatives, the pharmaceutically acceptable non-toxic salts thereof. Suitable salts include for example non-toxic metal salts such as the sodium, potassium, calcium and aluminum salts and non-toxic amine salts such as triethylamine, procaine, N,N-dibenzylethylenediamine, dehydroabietylamine, N, N-bis(dehydroabietyl) - ethylenediamine, N-ethylpiperidine and the like.

The free acids of this invention and salts thereof are useful for treatment of bacterial infections in animals, such as those caused by Gram-positive bacteria, particularly the so-called penicillin-resistant strains of *Staphylococcus aureus*. The compounds also exhibit activity against certain of the penicillin susceptible micro-organisms, and in addition are useful as nutritional supplements in animal feed and for the treatment of mastitis in cattle.

When employed as therapeutic antimicrobial agents, these compounds may be administered in any of the usual pharmaceutical forms such as tablets, capsules, powders, solution, suspensions, emulsions, ointments, and the like. The routes of administration may be either oral or parenteral, including intramuscular, subcutaneous and intravenous.

The following examples will serve to further typify the nature of this invention. These examples, however, should not be construed as a limitation on the scope of this invention, the scope being defined solely by the appended claims.

*Example 1*

3-phenylthianaphthene-2-carboxylic acid (5.1 g., 0.02 mole) is allowed to react with 11 ml. of thionyl chloride at room temperature overnight. The resulting solution is evaporated in vacuo at 35° C. and to the oil so obtained is added 25 ml. of benzene and the mixture then re-evaporated. After adding an additional 25 ml. of benzene and repeating the process, the residual oil is held under vacuum to remove any traces of thionyl chloride and 4 g. of the oil are then dissolved in 50 ml. of dried acetone. This solution is added slowly with stirring to 4.3 g. of 6-aminopenicillanic acid in 190 ml. of 3% sodium bicarbonate and 120 ml. of acetone. The reaction mixture is maintained at 25° for 1½ hours, extracted twice with 150 ml. of ether and to the residual aqueous solution is added 40 ml. of butyl acetate. This mixture is cooled to below 10°, adjusted to pH 2.4 with 20% phosphoric acid and the phases separated. The aqueous phase is extracted with 15 ml. of butyl acetate and the combined butyl extracts washed with 10 ml. of water and adjusted to pH 3. The washed organic solution is then dried over magnesium sulfate, filtered and to the filtrate is added 9.6 ml. of 30% potassium-2-ethylhexanoate in isopropanol. One volume of ether is then added with stirring and the crystals which form upon cooling are collected by filtration, washed with 1:1 ether-butyl acetate, then ether and finally dried to yield 6-(3-phenylthianaphthene-2-carboxyamido)-penicillanic acid as the potassium salt.

One gram of this potassium salt is dissolved in water and treated with dilute hydrochloric acid at <5° C. Extraction of this aqueous mixture with ether and evaporation of the dried ethereal extracts then yields the compound 6-(3-phenylthianaphthene-2-carboxyamido) - penicillanic acid.

In a similar fashion equivalent amounts of 5-chloro-3-phenylthianaphthene-2-carboxylic acid and 5-nitro-3-phenylthianaphthene 2-carboxylic acid are separately substituted for 3 - phenylthianaphthene - 2 - carboxylic acid. Upon completion of the steps herein described there are obtained respectively the compounds 6-(5-chloro-3-phenylthianaphthene-2-carboxyamido) - penicillanic acid and 6-(5-nitro-3-phenylthianaphthene - 2-carboxyamido)-penicillanic acid.

*Example 2*

To 56.7 g. (0.27 mole) of 2-phenylthianaphthene, 73 g. of anhydrous sodium acetate and 380 cc. of chloroform is added in a dropwise fashion to a solution of 28 ml. (0.56 mole) of bromine in 70 ml. of chloroform with intermittent cooling. Stirring is continued for one hour and 100 cc. of water are then added. The layers are separated and the organic layer washed respectively with 200 ml. of water, 100 ml. of 5% aqueous sodium hydroxide, 200 ml. of water and 200 cc. of saturated aqueous sodium sulfate. The dried solution is evaporated under reduced pressure to remove the solvent and distilled in vacuo to yield 2-phenyl-3-bromothianaphthene.

A solution of 28.9 g. (0.1 mole) of 3-bromo-2-phenyl-thianaphthene and 10 g. of cuprous cyanide in 75 ml. of N-methylpyrrolidone is refluxed twenty hours. The mixture is cooled; and 25 g. of ferric chloride in 40 ml. of water containing 5 ml. of concentrated hydrochloric acid are added. The mixture is heated on a steam bath for one hour to decompose the resultant complex. Toluene (100 ml.) is then added and the phases are separated. The aqueous phase is extracted three more times with 50 ml. portions of toluene. The combined toluene layers are then washed in turn with water, dilute hydrochloric acid, and 10% aqueous sodium hydroxide. Evaporation of dried organic solution then yields 3-cyano-2-phenylthianaphthene.

A mixture of 3-cyano-2-phenylthianaphthene, 23.5 g. (0.1 mole); 30 g. sodium hydroxide; 10 ml. of water and 120 ml. of ethylene glycol is refluxed for eighteen hours, cooled, and poured into 1 l. of water. The resulting solution is filtered and acidified with 6 N sulfuric acid to yield 2-phenylthianaphthene-3-carboxylic acid which may be further purified by recrystallization from aqueous alcohol.

2-phenylthianaphthene-3-carboxylic acid is employed in the procedure of Example 1 in place of 3-phenylthianaphthene-2-carboxylic acid. Upon completion of the steps therein described, there is obtained the compound 6-(2-phenylthianaphthene-3-carboxyamido)-penicillanic acid.

By employing equivalent quantities of 2-phenyl-6-methoxythianaphthene and 2-phenyl-5,6-dimethoxythianaphthene for 2-phenylthianaphthene in the procedure as described in this example, there are respectively obtained the compounds, 6-(2-phenyl-6-methoxythianaphthene-3-carboxyamido)-penicillanic acid and 6-(2-phenyl-5,6-dimethoxythianaphthene-3-carboxyamido)-penicillanic acid.

*Example 3*

A. Phenylpyruvic acid is treated with phenylhydrazine according to standard procedures to yield the phenylhydrazone of phenylpyrivic acid. Eleven grams of this phenylhydrazone are heated at reflux in 72 ml. of absolute ethanol and 8 ml. of concentrated sulfuric acid for one hour. At the end of this time, the solution is cooled and the excess acid neutralized by the addition of aqueous bicarbonate. The excess ethanol is then evaporated under reduced pressure and the residue taken up in 150 ml. of ether. This ethereal solution is washed with 10% aqueous sodium bicarbonate and then with water. The washed ethereal solution is dried over sodium sulfate and the ether then evaporated under reduced pressure to yield ethyl 3-phenylindole 2-carboxylate which is employed in the next step without further purification.

A mixture of 6.6 g. (0.025 mole) of ethyl 3-phenyl-indole 2-carboxylate in 2.4 g. (0.37 mole) of potassium hydroxide, 10 ml. of water and 65 ml. of methanol is refluxed for 1½ hours. At the end of this time, the methanol is removed by distillation and 40 ml. of water are added. The solution is then acidified to Congo red with concentrated sulfuric acid and the solid which forms is collected by filtration, washed with water, and dried to yield 3-phenylindole-2-carboxylic acid.

B. To 9.45 g. (0.04 mole) of 3-phenylindole-2-carboxylic acid is added 25 ml. of thionyl chloride in 50 ml. of anhydrous ether. The solution is allowed to stand for 40 minutes at room temperature and the resulting solution then evaporated below 35° C. To the residual oil so obtained is added 50 ml. of benzene and the mixture re-evaporated below 35° C. An additional 50 ml. of benzene are then added and the evaporation repeated. The residual oil is held vacuum to remove any traces of thionyl chloride.

Eight grams of 3-phenylindole-2-carboxyl chloride are dissolved in 100 ml. of dried acetone. This solution is slowly added with stirring to 8.6 g. of 6-amino-pencillanic acid in 280 ml. of 3% aqueous sodium bicarbonate solution and 240 ml. of acetone. The reaction mixture is maintained at 25° C. for 1½ hours and then extracted twice with ether. To the residual aqueous solution is added 80 ml. of butyl acetate and this mixture is next adjusted to pH 2.0 with 6 N sulfuric acid. The layers are separated, the aqueous layer being extracted with 30 ml. of butyl acetate and the organic layer being combined with these butyl acetate extracts. The combined organic solution is in turn washed with an aqueous solution which has been adjusted to pH 3. The organic solution is then dried over magnesium sulfate and filtered. To the filtrate is added 19.2 ml. of a 30% isopropanol solution of potassium-2-ethylhexanoate. One volue of ether is then added with stirring and the crystals which form upon cooling are collected by filtration, washed with 1:1 ether-butyl acetate, then washed with ether and finally dried to yield 6-(3-phenylindole-2-carboxyamido)-penicillanic acid as the potassium salt. The free acid is obtained by treatment with hydrochloric acid at 0° as heretofore described.

In a similar manner by employing the same quantity of 2-phenylindole-3-carboxylic acid in place of 3-phenylindole-2-carboxylic acid in the procedure of Part B of this example, there is obtained 6-(2-phenylindole-3-carboxyamido)-penicillanic acid.

*Example 4*

By substituting 9.45 g. of 2-phenylbenzofuran-3-carboxylic acid for 3-phenylthianaphthene-2-carboxylic acid in the procedure of Example 1, there is obtained 6-(2-phenylbenzofuran-3-carboxyamido)-penicillanic acid.

By employing 9.45 g. of 3-phenylindole-2-carboxylic acid in this procedure there is obtained the compound 6-(3-phenylindole-2-carboxyamido)-pencillanic acid.

In a similar fashion there are obtained according to these procedures from 3-phenyl-5-methylbenzofuran-2-carboxylic acid and 2-phenyl-5-methoxy-benzofuran-3-carboxylic acid, the compounds 6-(3-phenyl-5-methylbenzofuran-2-carboxyamido)-penicillanic acid and 6-(2-phenyl - 5 - methoxybenzofuran-3-carboxyamido)-penicillanic acid.

*Example 5*

Following the procedures of Part B of Example 3, 3-phenylquinoxaline-2-carboxylic acid (3 - phenylbenzopyrazine-2-carboxylic acid) is treated with thionyl chloride to yield the corresponding acid chloride. A solution of 8.4 g. of 3-phenylquinoxaline-2-carboxylic acid chloride in 100 ml. of dried acetone is then employed to treat 6-aminopenicillanic acid according to the method of that example. There is thus obtained upon completion of the procedure therein described, 6-(3-phenylquinoxaline-2-carboxyamido)-penicillanic acid.

*Example 6*

3-phenylfuran-2-carboxylic acid (3.8 g.) is substituted in the procedure of Part B of Example 3, thereby forming 6-(3-phenylfuran-2-carboxyamido)-penicillanic acid. Similarly from 2-phenylfuran-3-carboxylic acid is obtained by this method 6-(2-phenylfuran-3-carboxyamido)-penicillanic acid.

The requisite 3 - phenylfuran - 2 - carboxylic acid may be prepared by treatment of methyl 5,5-dimethoxy-3-phenyl-2,3-epoxypentanoate with p-toluenesulfonic acid followed by saponification of the resultant methyl 3-phenylfuran-2-carboxylate according to the methods of Burness, J.O.C., 21, 102 (1956).

Example 7

To a solution of 97.4 g. (0.56 mole) of 3-methyl-4-phenylthiophene in 150 ml. of carbon tetrachloride is added 88.5 g. (0.50 mole) of N-bromosuccimide and 0.2 g. of benzoyl chloride. The mixture is shaken vigorously and heated with an additional 0.2 g. of benzoyl chloride being added during the first ten minutes. Intermittent shaking is continued for one hour and the mixture then heated at reflux for five hours. The reaction mixture is then cooled and filtered and the solid washed with 50 ml. of carbon tetrachloride. The filtrate is evaporated under reduced pressure and the residue distilled in vacuo to yield 3-bromomethyl-4-phenylthiophene which is employed immediately in the next step.

Hexamethylenetetramine (69 g.) is added to 126.5 g. of 3 - bromomethyl-4-phenylthiophene in 200 ml. of chloroform and the mixture refluxed for one hour. After cooling, the solid is collected by filtration and recrystallized from ether. One hundred and fifty grams of this material are dissolved in 500 ml. of hot water and steam distilled until one liter of distillate is collected. This distillate is acidified with hydrochlorlic acid and extracted with three 100 ml. portions of ether. The ethereal extracts are dried over sodium sulfate and evaporated at steam bath temperature. The residue is then distilled at atmospheric pressure to yield 4-phenyl-3-thenaldehyde.

One hundred and fifty grams of silver nitrate are added to 70 g. of sodium hydroxide in 600 ml. of water. To this mixture is then added, with cooling, 80.8 g. (0.43 mole) of 4-phenyl-3-thenaldehyde in several small portions over a twenty minute period. The reaction mixture is allowed to stand for an additional thirty minutes and then filtered. The solid is washed with water and the combined filtrate and washings are acidified. This mixture is then allowed to stand with cooling until a solid forms and this solid then collected by filtration and recrystallized from alcohol to yield 4-phenylthiophene-3-carboxylic acid.

In a similar fashion by employing 2-phenyl-3-methylthiopene and 3-phenyl-2-methylthiophene in the procedure of this example, there are obtained the compounds 2-phenylthiophene-3-carboxylic acid and 3 - phenylthiophene-2-carboxylic acid.

By employing these phenylthiophene carboxylic acids in the procedure of Example 3, Part B there are respectively obtained the following compounds:

6-(4-phenylthiophene-2-carboxylamido)-penicillanic acid,
6-(2-phenylthiophene-3-carboxyamido)-penicillanic acid, and
6-(3-phenylthiophene-2-carboxyamido)-penicillanic acid.

2-phenyl-3-methylthiophene may be prepared by the action of sulfur on 1-phenyl-2-methyl-1-butene according to the method of Voronkov and Gol'stein, Chem. Abst. 45, 1577-b (1951).

Example 8

1,2-dichloroethyl ether (144 g.) and ethylbenzoylacetate (86 g.) are stirred in 10% aqueous ammonium hydroxide solution at steam bath temperature for three hours while introducing a stream of ammonia gas. At the end of this time, the solution is cooled and extracted with chloroform. These extracts are dried and evaporated to an oil which is then taken up in benzene and chromatographed on activated alumina. Employing benzene as the solvent, the initial 2000 ml. are collected and evaporated to yield the ethyl ester of 2-phenylpyrrole-3-carboxylic acid. This ester is subjected to hydrolysis with 5% sodium hydroxide solution at steam bath temperatures for two hours under an atomsphere of nitrogen. At the end of this time, the mixture is acidified and the solid collected by filtration and dried to yield 2-phenylpyrrole-2-carboxylic acid. By employing this acid in the procedure of Example 3, Part B, there is obtained the compound 6-(2-phenylpyrrole-3-carboxyamido)-penicllanic acid.

3-phenylpyrrole (18.1 g.) is dissolved in 24 ml. of anhydrous ethyl ether and added dropwise to an ethereal solution of ethyl magnesium bromide prepared from 3 g. of magnesium turnings. The mixture is refluxed for 30 minutes and 12 ml. of ethyl chloroformate in 24 ml. of ether are then added. The mixture is refluxed for one hour and then allowed to stand overnight. Seventy-two milliliters of saturated ammonium chloride solution and 24 ml. of water are then added to decompose the mixture and the product then extracted with ethyl ether. These extracts are dried and evaporated to yield an oil which is then fractionally distilled to yield the ethyl ester 3-phenylpyrrole-2-carboxylic acid.

This ester is then subjected to hydrolysis under nitrogen as heretofore described in this example to yield 3-phenylpyrrole-2-carboxylic acid. Conversion to the acid chloride and acylation of 6-aminopenicillanic acid is accomplished according to the procedure of Example 3, Part B, thereby yielding 6-(3-phenylpyrrole-2-carboxyamido)-penicillanic acid.

Example 9

Following the procedure of Example 3, Part B, the acid chlorides of the following acids are prepared and employed to acylate 6-aminopenicillanic acid, thereby forming the corresponding product.

Acid:
   (a) 3-phenylpyridine-2-carboxylic acid
   (b) 3-phenylpyridine-4-carboxylic acid
   (c) 2-phenylpyridine-3-carboxylic acid
   (d) 3-phenylpyrazole-4-carboxylic acid
   (e) 4-phenylpyrazole-3-carboxylic acid
   (f) 5-phenylthiazole-4-carboxylic acid
   (g) 4-phenylthiazole-5-carboxylic acid
   (h) 5-phenylpyridazine-4-carboxylic acid
   (i) 4-phenyl-1H-1,2,3-triazole-5-carboxylic acid
   (j) 5-phenyl-1,2,3-thiadiazole-4-carboxylic acid
   (k) 3-phenyl-1,2,5-thiadiazole-4-carboxylic acid Product:
   (a) 6-(3-phenylpyridine-2-carboxyamido)-penicillanic acid
   (b) 6-(3-phenylpyridine-4-carboxyamido)-penicillanic acid
   (c) 6-(2-phenylpyridine-3-carboxyamido)-penicillanic acid
   (d) 6-(3-phenylpyrazole-4-carboxyamido)-penicillanic acid
   (e) 6-(4-phenylpyrazole-3-carboxyamido)-penicillanic acid
   (f) 6-(5-phenylthiazole-4-carboxyamido)-penicillanic acid
   (g) 6-(4-phenylthiazole-5-carboxyamido)-penicillanic acid
   (h) 6-(5-phenylpyridazine-4-carboxyamido)-penicillanic acid.
   (i) 6-(4-phenyl-1H-1,2,3-triazole-5-carboxyamido)-penicillanic acid.
   (j) 6-(5-phenyl-1,2,3-thiadiazole-4-carboxyamido)-penicillanic acid.
   (k) 6-(3-phenyl-1,2,5-thiadiazole-4-carboxyamido)-penicillanic acid.

Example 10

To 19.0 g. (0.1 mole) of 2-chloro-3-phenylpyrazine in 100 ml. of N-methylpyrrolidone is added 16.1 g. (0.18 mole) of cuprous cyanide and the solution then heated at reflux for one hour. The cooled reaction mixture is then placed on alumina and eluted with benzene. The product is collected and the solvent evaporated to yield 2-cyano-3-phenylpyrazine. The material is then subjected to hydrolysis by a mixture of ethylene glycol and water with heat for sixteen hours. The reaction mixture is cooled and rendered slightly acidic. The solid which forms is collected to yield 3-phenylpyrazine-2-carboxylic acid, which when subjected to the procedure of Example 3, Part B, yields 6-(3-phenylpyrazine-2-carboxyamido)-penicillanic acid.

The requisite 2-chloro-3-phenylpyrazine may be prepared by treatment of 2-hydroxy-3-phenylpyrazine with phosphoryl chloride.

Example 11

Following the procedure of Example 3, Part B, 5-phenyl-1,2,3-oxadiazole-4-carboxylic acid is converted to its acid chloride which in turn is employed to acylate 6-aminopenicillanic acid, thereby yielding 6-(5-phenyl-1,2,3-oxadiazole-4-carboxyamido)-penicillanic acid.

5-phenyl-1,2,3-oxadiazole-4-carboxylic acid may be obtained by alkaline hydrolysis of its known ethyl ester according to the procedure described in the last paragraph of Example 8.

Example 12

Ten grams of 4-phenylpyrimidine in 50 ml. of glacial acetic acid were treated dropwise with a molar equivalent to bromine at 45° C. with stirring. Upon completion of the additon, the reaction mixture is cooled and diluted with water until a solid forms. This solid is collected by filtration and recrystallized from glacial acetic acid to yield 5-bromo-4-phenylpyrimidine.

A stirred mixture of 5-bromo-4-phenylpyrimidine (0.12 mole) 15.4 g. (0.17 mole) of cuprous cyanide and 20 ml. of dimethylformamide is refluxed for four hours. The resulting mixture is poured into a solution of hydrated ferric chloride (50 g.) and concentrated hydrochloric acid (12 ml.) in water (50 ml.). After the reaction mixture has been maintained at 60–70° C. for 15 minutes to decompose the complex, 50 ml. of toluene are added and the layers are separated. The aqueous layer is again extracted with 50 ml. of toluene. The combined toluene extracts are washed with dilute hydrochloric acid, water, 10% aqueous sodium hydroxide solution, dried over magnesium sulfate, and distilled in vacuo to give 5-cyano-4-phenylpyrimidine. The 5-cyano-4-phenylpyrimidine is then subjected to alkaline hydrolysis in 10% aqueous sodium hydroxide. Acidification of the reaction mixture then forms 4-phenylpyrimidine-5-carboxylic acid which is further purified by recrystallization from aqueous alcohol.

Substitution of 4-phenylpyrimidine-5-carboxylic acid in the procedure of Example 3, Part B, then yields the product 6 - (4 - phenylpyrimidine - 5 - carboxyamido) penicillanic acid.

Example 13

Following the procedure of Example 3, Part B, 2-phenylquinoline 3-carboxylic acid is converted to its acid chloride which in turn is employed to acylate 6-aminopenicillanic acid so as to yield 6-(2-phenylquinoline-3-carboxyamido-penicillanic acid.

Example 14

One gram of 6-(2-phenylthianaphthene-3-carboxyamido)-penicillanic acid is dissolved in excess amyl acetate and to the solution is added 10 g. of N-ethylpiperidine. The solution is stirred for 30 minutes and the crystals formed upon standing are collected by filtration and dried to yield the N-ethylpiperidine salt of 6-(2-phenylthianaphthene-3-carboxyamido)-penicillanic acid.

Example 15

One gram of 6-(3-phenylthianaphthene-2-carboxyamido)-penicillanic acid is dissolved in excess amyl acetate and to the solution is added 10 g. of triethylamine. The solution is stirred for 30 minutes and the crystals which form upon standing are collected by filtration and dried to yield the triethylamine salt of 6-(3-phenylthianaphthene-2-carboxyamido)-penicillanic acid.

Example 16

An ethereal solution of 6-(3-phenylquinoxaline-2-carboxyamido)-penicillanic acid is extracted with a saturated aqueous solution of calcium hydroxide until the pH is 6.5. The extracts thus obtained are lyophilized to yield the calcium salt of 6-(3-phenylquinoxaline-2-carboxyamido)-penicillanic acid.

Example 17

One gram of potassium 6-(2-phenylthiophene-3-carboxyamido)-penicillanate is dissolved in water at room temperature and to the solution is added 10 ml. of a 10% aqueous solution of N,N'-dibenzylethylene-diamine aceatte. The mixture is stirred, allowed to stand for one hour and then cooled. The solid which forms is collected by filtration and dried to yield 6-(2-phenylbenzamido)-penicillanic acid as the N,N-dibenzylethylenediamine salt.

We claim:
1. A compound of the formula:

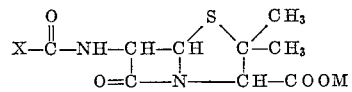

wherein
X is a fused benzoheterocyclic nucleus having a structure selected from the group consisting of

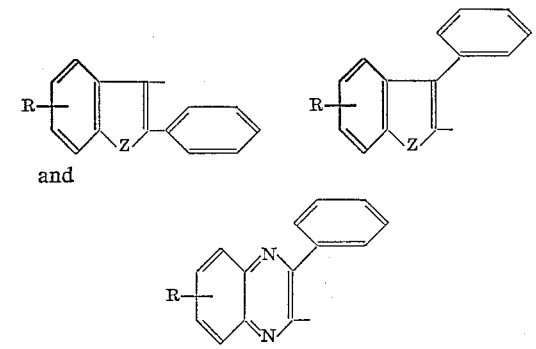

where
Z is a member selected from the group consisting of

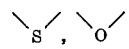

and

and
R is a member selected from the group consisting of hydrogen chloro, bromo, methyl, ethyl, methoxy, amino, trifluoromethyl, amido and hydroxy; and
M is the cation form of a member selected from the group consisting of hydrogen, sodium, potassium, calcium, aluminum, triethylamine, procaine, N,N-dibenzylethylenediamine, dehydroabietylamine, N,-N-bis(dehydroabietyl)-ethylenediamine and N-ethylpiperidine.

2. 6 - (3 - phenylthianaphthene - 2 - carboxyamido) penicillanic acid.
3. 6 - (2 - phenylthianaphthene - 3 - carboxyamido) penicillanic acid.
4. 6 - (3 - phenylindole - 2 - carboxyamido) - penicillanic acid.
5. 6 - (2 - phenylindole - 3 - carboxyamido) - penicillanic acid.
6. 6 - (3 - phenylbenzofuran - 2 - carboxyamido) penicillanic acid.

7. 6 - (2 - phenylbenzofuran - 3 - carboxyamido) penicillanic acid.

8. 6 - (2 - phenylquinoxaline - 3 - carboxyamido) penicillanic acid.

References Cited by the Examiner

UNITED STATES PATENTS

| | | | |
|---|---|---|---|
| 2,941,995 | 6/1960 | Doyle et al. | 260—239.1 |
| 2,996,501 | 8/1961 | Doyle et al. | 260—239.1 |

OTHER REFERENCES

Journal Amer. Med. Assoc., page 466 (1958).

NICHOLAS S. RIZZO, *Primary Examiner.*

WALTER A. MODANCE, *Examiner.*

JAMES W. ADAMS, *Assistant Examiner.*